United States Patent [19]

Peters

[11] Patent Number: 5,118,204

[45] Date of Patent: Jun. 2, 1992

[54] LINEAR SLIDE AND METHOD OF MANUFACTURE THEREOF

[76] Inventor: Roger Peters, 2260 American Ave., Unit 1, Hayward, Calif. 94545

[21] Appl. No.: 627,771

[22] Filed: Dec. 14, 1990

[51] Int. Cl.⁵ .............................................. F16C 29/02
[52] U.S. Cl. ........................................ 384/42; 384/43
[58] Field of Search .................. 384/42, 43, 40, 15, 384/33, 34

[56] References Cited

U.S. PATENT DOCUMENTS

| | | | |
|---|---|---|---|
| 3,326,032 | 6/1967 | Stuhldreher | 384/41 |
| 4,773,769 | 9/1988 | Church | 384/42 |
| 4,941,758 | 7/1990 | Osawa | 384/42 |
| 4,978,233 | 12/1990 | Stotzel | 384/42 |

*Primary Examiner*—Lenard A. Footland
*Attorney, Agent, or Firm*—Harris Zimmerman

[57] ABSTRACT

Apparatus for translating objects along a path is constructed in a manner which automatically conforms surfaces of a guideway with adjacent surfaces of a rail that extends along the guideway and thereby realizes very precise travel. A housing containing the guideway initially has a channel that is broader than the guideway. Plates are loosely disposed in the channel and strips of resilient material extend from the plates to the channel walls. The rail is emplaced between the plates and a cover plate is secured to the housing over the rail. This wedges the plates apart and compresses the resilient material while causing the top of the rail to be strictly parallel with the cover plate and while causing the plates to be strictly parallel with the rail side surfaces. Hardenable liquid adhesive is injected into the channel to unitize the plates with the housing.

8 Claims, 3 Drawing Sheets

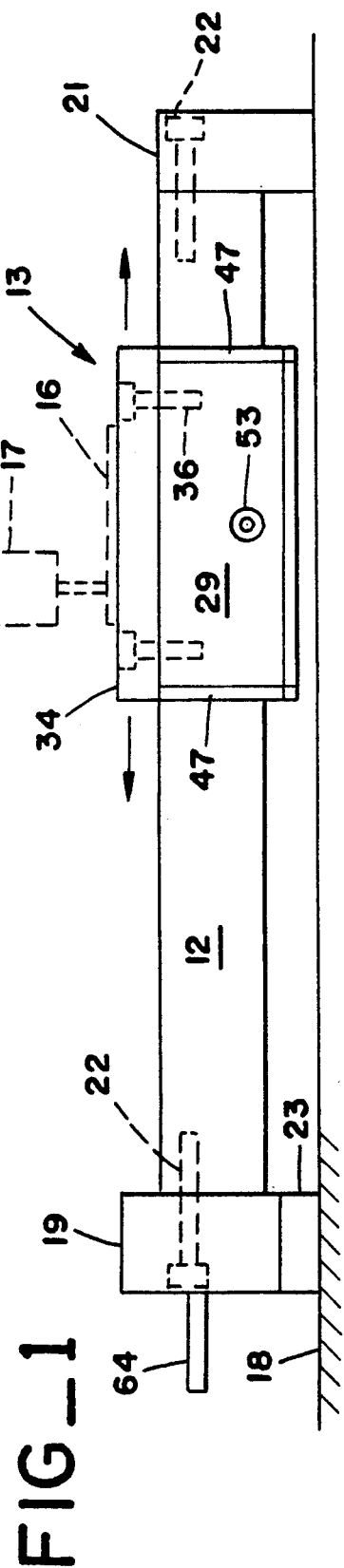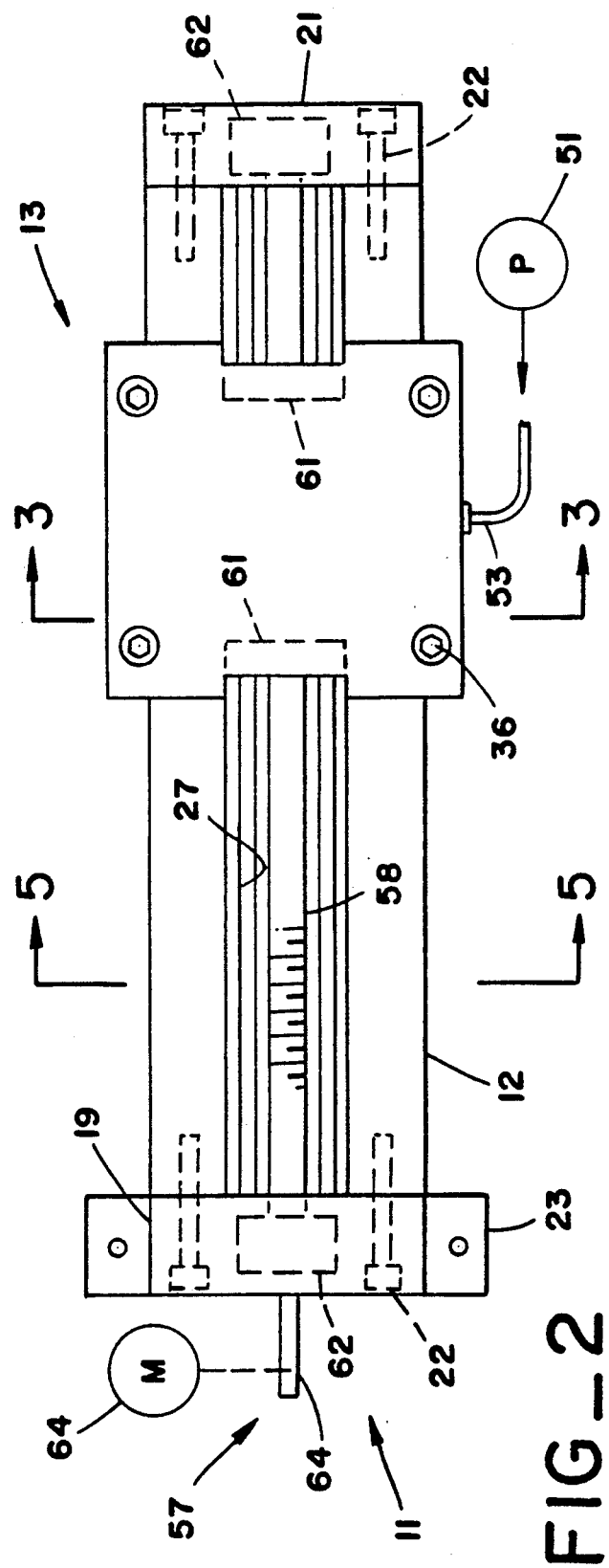

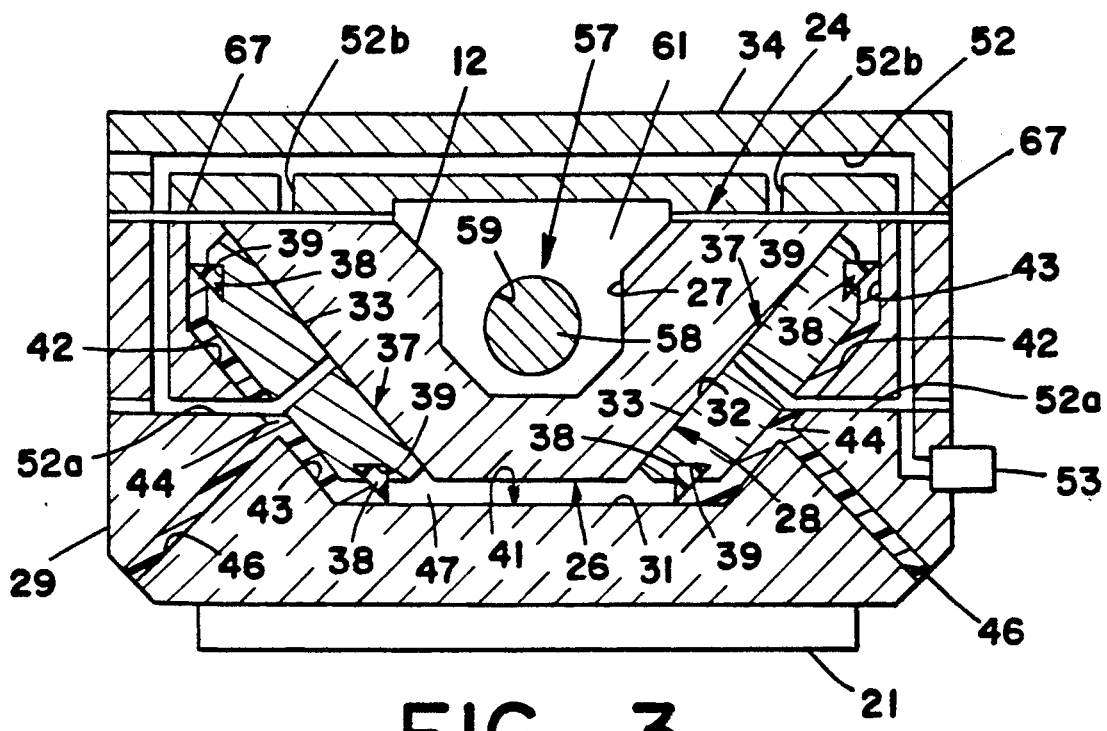
FIG_3
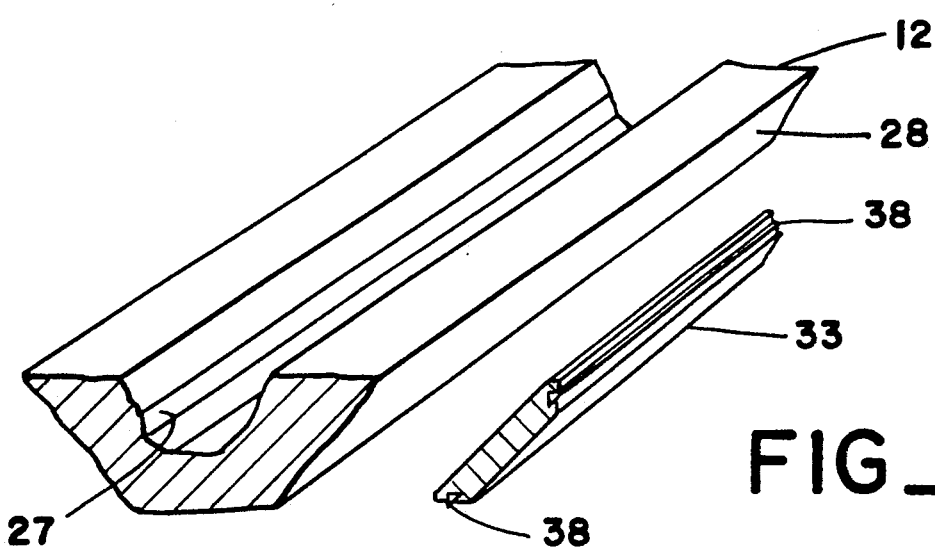
FIG_4
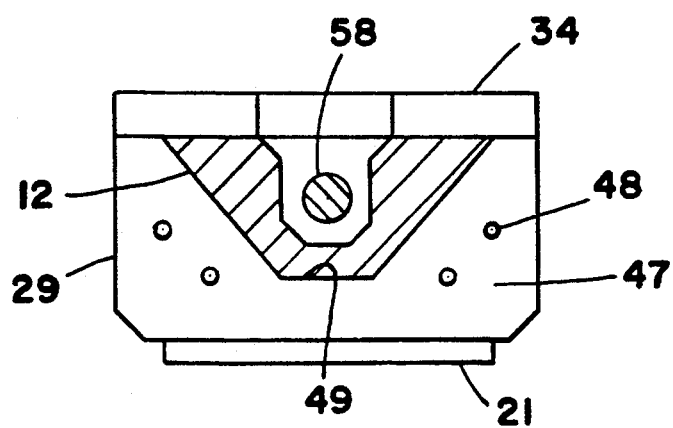
FIG_5

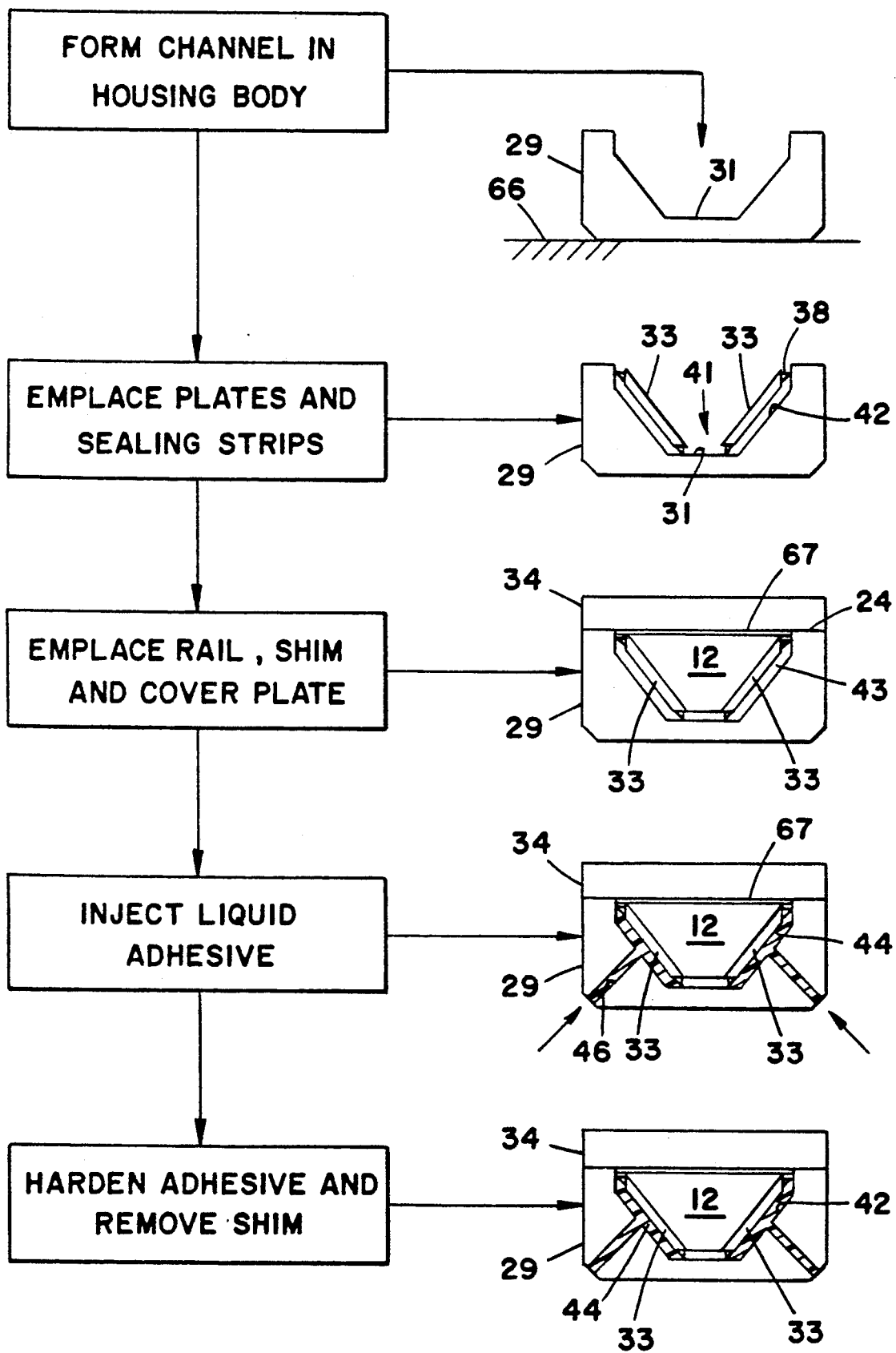
FIG_6

LINEAR SLIDE AND METHOD OF MANUFACTURE THEREOF

TECHNICAL FIELD

This invention relates to apparatus for enabling a precise and controlled translation of supported objects along a predetermined path and to a method of manufacture of apparatus of this type.

BACKGROUND OF THE INVENTION

A variety of industrial and scientific operations require a very precise movement of objects along a linear path. As one example, products which must have a very precise thickness or a very flat surface are tested by mounting the products on a translatable housing or bed which then travels the products along a dimension sensing gauge or the like. The disk reading heads used in computers are an example of products which are tested or certified in this manner. The specimen holding stages of scanning microscopes are another example of mechanisms requiring very accurate translation and positioning of objects.

One type of translating device that is used for such purposes includes a rail which is supported at the ends and a housing or platform for supporting objects that is traveled along the rail by a motor or other means. The housing has a guideway passage through which the rail extends and the walls of the guideway serve to prevent movement of the housing relative to the rail in directions other than along the rail.

The accuracy of testing operations of the above described kind depends on the degree to which such unwanted movements of the housing are inhibited. In order to obtain high accuracy it is necessary that the rail and the guideway walls be manufactured with great precision and with very tight clearances. Surfaces of the guideway that slide along surfaces of the rail should have exactly the same orientations as the adjacent rail surfaces.

Manufacture of the components with the most desirable degree of precision is at best very costly if conventional metal machining techniques are used. It is particularly difficult to conform the orientation of the walls of the guideway with the orientation of the rail surfaces while also providing a predetermined small clearance.

Thus a high precision linear slide construction that can be manufactured in a simpler and more economical manner would be highly advantageous.

The present invention is directed to overcoming one or more of the problems discussed above.

SUMMARY OF THE INVENTION

In one aspect, the present invention provides a method for manufacturing a linear slide of the type used for precise, controlled translation of objects, the linear slide being of the type having a housing with a guideway and a rail which extends along the guideway. Steps in the method include providing a housing with a channel that is broader than the guideway and along which the guideway extends, loosely disposing a plate in the channel in position to form a sidewall of the guideway and emplacing the rail in the channel with a side of the rail being abutted against the plate in parallel relationship with the plate. The region of the channel that is at the opposite side of the plate from the rail is then sealed and liquid adhesive is injected into the sealed region The adhesive is then hardened to unitize the plate with the housing in an orientation at which the plate forms a sidewall of the rail guideway.

In another aspect, the invention provides a method for manufacturing a linear slide wherein the rail has a base surface that is narrower than the top surface and side surfaces that are convergent towards the base surface. Steps in the method include providing a channel in the housing that is broader and deeper and shorter than the rail A pair of plates are loosely disposed in the channel in oppositely inclined orientations corresponding to the convergent side surfaces of the rail. Regions of the channel that are at opposite sides of the plates from the rail are sealed by disposing strips of resilient material along boundaries of the regions. The rail is then emplaced in the channel between the plates. A cover plate is then attached to the housing over the rail in position to exert pressure on the rail. This causes the rail to wedge the plates apart and thereby causes a compression of the strips of resilient material. Compression of the strips enhances the sealing effect of the strips and also produces a force on the plates that assures that the plates are abutted against the side surfaces of the rail and have precisely the same orientations. Fillings of liquid adhesive are then injected into the sealed regions of the channel and are hardened to unitize the plates with the housing at positions at which the plates and cover plate define a guideway that conforms precisely with the side and top surfaces of the rail.

In another aspect, the invention provides a linear slide for translating objects which slide includes a housing with a linear guideway and a linear rail that extends along the guide way. The housing has a channel within which the guideway extends and which has an inner wall that is spaced apart from the location of the guideway. A plate is disposed between the inner wall of the channel and the rail in parallel relationship with the rail and in position to form a sidewall of the guideway, the plate being adjacent the rail and being spaced apart from the inner wall of the channel. A filling of hardened adhesive material between the plate and the inner wall secures the plate to the inner wall.

In still another aspect of the invention, an air bearing linear slide includes a linear rail having a base surface, a flat top surface that is broader than the base surface and flat side surfaces that are convergent towards the base surface. Supports at opposite ends of the rail are proportioned to hold the rail in spaced apart relationship with the underlying surface. A housing supported by the rail and which is travelable along the rail has a guideway passage through which the rail extends. The housing includes a body with a channel in which the guideway is situated and a cover member which spans the channel and which is secured to the body, the cover member having a flat undersurface which faces the top surface of the rail and which is parallel to the rail. A pair of plates are disposed in the channel and form opposite sidewalls of the guideway. The plates have flat surfaces facing the rail that have the same orientation as the adjacent side surfaces of the rail. A first pair of strips of compressed resilient- material extend between a first of the plates and the housing body and a second pair of such strips extend between the other plate and the housing body at the opposite side of the rail. A first volume of hardened adhesive material extends from the first plate to the housing body between the first pair of strips and another volume of hardened adhesive extends from the other plate to the body between the second pair of strips. Further components of the apparatus include means for directing a flow of compressed air between the rail and the plates and between the rail and the cover plate and means for traveling the housing along the rail.

The invention provides mechanism for translating and positioning objects with extreme precision and accuracy that can be economically manufactured, primarily from extruded components in the preferred embodiment. Conforming the shape of a guide passage for a rail with the rail itself is easily accomplished a portions of the guideway wall are formed by plates that are initially free to self-adjust against the rail in response to forces which urge the plates into the same orientations as the adjacent rail surfaces. The plates are then immobilized and unitized with other portions of the structure.

The invention, together with further aspects and advantages thereof, can be further understood by reference to the following description of the preferred embodiment and by reference to the accompanying drawings.

BRIEF DESCRIPTION OF THE DRAWINGS

FIG. 1 is a side elevation view of an air bearing linear slide in accordance with the preferred embodiment of the invention.

FIG. 2 is a plan view of the apparatus of FIG. 1 with certain additional components being depicted schematically.

FIG. 3 is a cross section view of the apparatus taken along line 3—3 of FIG. 2.

FIG. 4 is an exploded perspective view of certain of the components of the apparatus shown in the preceding figures.

FIG. 5 is a cross section view of the apparatus taken along line 5—5 of FIG. 2.

FIG. 6 is a diagramatic illustration of successive steps in a method for manufacturing the apparatus of the preceding figures.

DETAILED DESCRIPTION OF THE PREFERRED EMBODIMENT

Referring jointly to FIGS. 1 and 2 of the drawings, major components of an air bearing linear slide 11 in accordance with this embodiment of the invention include a linear rail 12 and a housing 13 which is supported on the rail. Housing 13 can be traveled along rail 12 by turning of a lead screw 58 in order to carry objects 16 along a predetermined path of travel.

The objects 16 which this particular example of the invention was designed to carry are disk reading heads for computers which are translated past a sensing device 17 of known design that determines if the head has a uniform thickness that is within predetermined close tolerances. The invention can also be used to translate and position a variety of other objects.

Rail 12 is held in spaced apart relationship with the underlying surface 18 by front and rear supports 19 and 21 respectively which may be attached to the ends of the rail by bolts 22. Apertured sidewardly extending lugs 23 at the base of front support 19 enable bolting of the linear slide 11 to the underlying surface 18, when necessary, in order to prevent movement of the device as a whole.

Referring jointly to FIGS. Z and 3, rail 12 has flat parallel top and base surfaces 24 and 26 respectively and the rail is broader at the top than at its base. Top surface 24 is divided into two spaced apart coplanar segments by a groove 27 which extends along the length of rail 12 at a centered location on the rail. Flat side surfaces 28 of the rail converge towards the base surface 24.

Housing 13 includes a body 29 having a channel 31 that is broader than rail 12 and of greater height. A guideway 32 for rail 12 is defined in part by a pair of sidewall plates 33 situated in channel 31 and in part by a cover plate 34 which spans the channel and which is secured to body 29 by bolts 36. Plates 33 are oppositely inclined and each has a flat surface 37 that is parallel to an adjacent one of the convergent side surfaces 28 of rail 12. With reference to FIGS. 3 and 4, linear strips 38 of resilient material such as rubber are seated in grooves 39 that extend along the top and bottom regions of each plate 33 and extend outward from the plates to contact the floor 41 of channel 31 in the case of the lowermost strips and to contact the inner walls 42 of the channel in the case of the upper ones of the strips.

The strips 38, which preferably have a triangular cross sectional configuration, are compressed against the floor 41 and the inner walls 42 of channel 31 during manufacture of the apparatus as will hereinafter be described in more detail and act to seal the regions 43 of channel 31 that are between the plates 33 and the inner walls of the channel. Plates 33 are secured to the channel walls 42 and thereby unitized with the housing body 29 by fillings 44 of hardened liquid adhesive within the sealed regions 43, epoxy plastic being one example of a suitable filling material. Lower portions of the inner walls 42 of channel 31 may have an inclination similar to that of the plates 33 to minimize the volume of the fillings 44. Passages 46 in housing body 29 extend from each sealed region 43 to the exterior of the body to enable injection of the liquid adhesive.

Referring to FIGS. 3 and 5, the ends of the sealed regions 43 are closed by end plates 47 secured to each end of housing body 29 by bolts 48, each such end plate having a notch 49 shaped to receive the rail 12.

With reference to FIGS. 2 and 3 in conjunction, the apparatus operates as an air bearing as a flow of compressed air from a pump 51 or other source is directed into the side regions and the top region of channel 31. An air passage 52 connects with an air intake fitting 53 at one side of housing body 29 and extends upward within that side of the body into cover plate 34 and then then extends transversely within the cover plate and down into the opposite side of the housing body. A pair of branch passages 52a which are within opposite sides of housing body 29 transmit air flow from passage 52 through the adhesive fillings 44 and sidewall plates 33 to opposite sides of channel 31. An additional pair of branch passages 52b transmit portions of the air flow downward within cover plate 34 to the regions between the cover plate and the top surfaces 24 of rail 12. This causes thin films of air to flow between the surfaces of rail 12 which face surfaces of body 29 and cover plate 34. The air flow maintains a minute clearance between the rail 12 and other components of housing 13 and thereby minimizes friction and wear. It should be understood that the invention is also applicable to mechanisms that do not include an air bearing effect and which rely on liquid lubricants or the like.

Means 57 for traveling the housing 13 along rail 12 may take a variety of forms. In this example, such means 57 includes a threaded tubular lead screw 58 which extends along groove 27 within rail 12 and which engages in a threaded passage 59 in one of a pair of cover plate end members 61 that extend down into the groove 27. Lead screw 58 is supported and journalled by bearings 62 within the front and rear rail supports 19 and 21. A reduced diameter end portion 63 of lead screw 58 extends forward from the front rail support 19 and may be rotated by a motor 64 to travel the housing 13 along rail 12. Motor 64 is reversible to provide for travel in either direction.

The above described construction provides a linear slide 11 in which the guideway wall surfaces 37 and cover plate 24 are each aligned in an exactly parallel relationship with the adjacent surfaces 28 and 24 of rail 12 but which does not require extended and costly machining operations to achieve that result. Precise conformity of the guideway 32 with rail 12 is brought about automatically in the course of assembling the components using the method of the present invention.

In particular, with reference to FIG. 6, housing body 29 is rested on a flat horizontal surface 66 and plates 33 are loosely disposed in channel 31 approximately in the positions that the plates will occupy in the finished product. When so placed, the plates 33 lean against the inner walls 42 of channel 31. The upper resilient strips 38 contact walls 42 and the lower strips contact the floor 41 of channel 31.

Rail 12 is then emplaced within channel 31 between the plates 33. The weight of rail 12 then urges plates 33 apart and forces each plate into an exactly parallel relationship with the adjacent side surface 28 of the rail. The urging apart of plates 33 also compresses strips 38 and thereby seals the regions 43 between the plates and the inner walls 42 of channel 31.

Further steps in the method include attachment of cover plate 34 to the housing body 29. Abutment of the undersurface of the cover plate 34 against the top surface 24 of rail 12 followed by bolting down of the cover plate shifts rail 12 into an orientation at which the rail top surface is in an exactly parallel relationship with the cover plate. This may require some further repositioning of plates 33 but this comes about automatically since the compressed resilient strips 38 act to urge the plates against the side surfaces 23 of the rail and the strips may expand or contract to accommodate to the plate movement.

The process may be seen as one in which one guideway surface, defined by cover plate 34, is fixed while the guideway surfaces defined by plates 33 and the rail 12 itself are initially able to self adjust to accommodate to the fixed surface.

Following the self adjustments of rail 12 and plates 33, the plates are fixed in position and unitized with the housing body 29 by injecting hardenable liquid adhesive 44, such as epoxy, into regions 43 through passages 46. Hardening or curing of the adhesive 44 then secures the plates 33 to the inner walls 42 of housing body 29.

It is usually desirable that there be some small clearance between the rail 12 and the surfaces that define guideway 32. This may be provided for, after the above described steps, by temporarily removing top cover 34, placing a thin flat shim 67 between the top cover 34 and the adjacent surfaces of housing body 29 as shown in FIG. 3 and then resecuring the top cover to the body. Alternately, as shown in FIG. 6, a shim may be placed between the rail 12 and top cover 34 prior to injection of the adhesive into channel regions 43 which shim is removed following hardening of the adhesive.

Referring again to FIG. 3, it is preferable that the air flow passages 52a not be present until such time as the adhesive 44 has hardened as otherwise the semi-liquid uncured adhesive may enter such passages. Thus drilling of at least passages 52a is preferably deferred until the method steps of FIG. 6 have been completed.

The linear slide 11 which has been herein described for purposes of example has a housing 13 that travels along the rail 12 and supports the objects which are to be translated. The invention is also adaptable to constructions in which the housing is the stationary component while the rail travels and supports other elements. Similarly, the invention is not limited to rails and guideways which have the particular cross-sectional configuration of the embodiment which has been described. For example, one or more of the inner surfaces of a guideway of rectangular cross section can be self positioned in the course of manufacture by procedures essentially similar to those described above.

Thus while the invention has been described with respect to a single preferred embodiment, many variations are possible and it is not intended to limit the invention except as defined by the following claims.

I claim:

1. In a linear slide for translating objects supported thereby, said linear slide having a housing with a linear guideway and a linear rail which extends along said guideway, the improvement comprising:
    said housing having a channel within which said guideway extends, the channel having an inner wall that is spaced apart from the location of said guideway,
    a plate disposed between said inner wall and said rail in parallel relationship with said rail and in position to form a sidewall of said guideway, said plate being adjacent said rail and being spaced apart from said inner wall of said channel, and
    a filling of hardened adhesive material in said channel between said plate and said inner wall which adhesive material secures said plate to said inner wall.

2. The apparatus of claim 1 wherein said rail has a base surface that faces the base region of said guideway and has opposite side surfaces which are convergent towards said base surface, and wherein said guideway is formed at least in part by a pair of said plates disposed in said channel at opposite sides of said rail and which have oppositely inclined orientations conforming to said convergent side surfaces of said rail, each of said plates being secured to said housing and held at said orientation by a filling of hardened adhesive material situated between the plate and an adjacent inner wall of said channel.

3. The apparatus of claim 2 further including a cover plate spanning said channel and being secured to said housing, said cover plate having an inner surface which extends in parallel relationship with said rail and which is spaced apart from said rail to provide a predetermined clearance therebebetween when said rail rests on said plates.

4. The apparatus of claim 3 further including a flat shim disposed between said cover plate and said housing, said shim having a thickness equal to said predetermined clearance.

5. The apparatus of claim 3 further including a flat shim disposed between said cover plate and said rail, said shim having a thickness equal to said predetermined clearance.

6. The apparatus of claim 3 further including means for directing a flow of compressed gas into the region between said rail and said plates and the region between said rail and said cover plates.

7. The apparatus of claim 2 further including strips of compressed resilient material extending from said plates to said adjacent inner walls of said channel and forming boundaries of said fillings of hardened adhesive material.

8. An air bearing linear slide comprising:
a linear rail having a base surface and a flat top surface that is broader than said base surface and flat side surfaces that are convergent towards said base surface,
first and second rail supports situated at opposite ends of said rail and being proportioned to hold said rail in spaced apart relationship with the underlying surface,
a housing supported by said rail for travel therealong and having a guideway passage through which said rail extends, said housing having a body with a channel extending therethrough in which said guideway is situated and having a cover member which spans said channel and which is secured thereto, said cover member having a flat undersurface facing said top surface of said rail and being in parallel relationship therewith,
a pair of plates disposed in said channel at opposite sides of said rail and forming opposite side walls of said guideway, said plates having flat surfaces facing said rail that are parallel to the adjacent one of said side surfaces thereof,
a plurality of strips of compressed resilient material disposed in said channel wherein a first spaced apart pair of said strips extend between said housing body and a first of said plates and a second spaced apart pair of said strips extend between said housing body and the other of said plates at the opposite side of said rail,
a first volume of hardened adhesive material extending from said first plate to said housing body between said first pair of strips and a second volume of hardened adhesive material extending from said other plate to said housing body between said second pair of strips,
means for directing a flow of compressed air between said rail and said plates and between said rail and said cover plate, and
means for traveling said housing along said rail.

* * * * *